US012639304B1

(12) United States Patent
Khansari et al.

(10) Patent No.: US 12,639,304 B1
(45) Date of Patent: May 26, 2026

(54) PATTERN RECOGNITION IN APPLICATION DATABASE QUERIES WITH SCHEDULED PRE-CACHED DATA RETRIEVAL

(71) Applicant: DISH Wireless L.L.C., Englewood, CO (US)

(72) Inventors: Mahdi Khansari, Littleton, CO (US); David Ricardo Bentolila Sapiani, Littleton, CO (US); Abbas Ali Khan, Aurora, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 0 days.

(21) Appl. No.: 19/068,462

(22) Filed: Mar. 3, 2025

(51) Int. Cl.
G06F 16/2453 (2019.01)
(52) U.S. Cl.
CPC .............................. G06F 16/24539 (2019.01)
(58) Field of Classification Search
CPC ................................................. G06F 16/24539
USPC ......................................................... 707/717
See application file for complete search history.

(56) References Cited

U.S. PATENT DOCUMENTS

2017/0300713 A1* 10/2017 Fan ........................ G06F 16/245
2024/0045893 A1* 2/2024 Reddy ................. G06F 16/3344

* cited by examiner

*Primary Examiner* — Cam Y T Truong
(74) *Attorney, Agent, or Firm* — Lowenstein Sandler LLP

(57) ABSTRACT

Technologies directed to pattern recognition in application database queries with scheduled pre-cached data retrieval are described. One method identifies, using a machine learning (ML) model, a query pattern from a set of historical data queries directed to one or more target databases. Each of the historical data queries includes parameters, including a temporal range to retrieve data corresponding to a specific period. The method retrieves, according to the query pattern, pre-retrieved data from the one or more target databases, storing the pre-retrieved data in a cache server. The method receives a subsequent data query from an application after retrieving the pre-retrieved data. The method determines that the subsequent data query matches the query pattern. The method retrieves the pre-retrieved data corresponding to the subsequent data query from the cache server. The method sends the pre-retrieved data corresponding to the subsequent data query to the application.

14 Claims, 8 Drawing Sheets

700

RECEIVE A PLURALITY OF DATA QUERIES FROM ONE OR MORE APPLICATIONS DIRECTED TO A TARGET DATABASE, EACH OF THE PLURALITY OF DATA QUERIES COMPRISES A PLURALITY OF PARAMETERS, WHEREIN AT LEAST ONE OF THE PLURALITY OF PARAMETERS COMPRISES A TEMPORAL RANGE TO RETRIEVE DATA CORRESPONDING TO A SPECIFIC PERIOD 702

STORE A COPY OF EACH OF THE PLURALITY OF DATA QUERIES IN A DATA STORE 704

IDENTIFY, USING A MACHINE LEARNING (ML) MODEL AND THE PLURALITY OF PARAMETERS, A QUERY PATTERN IN THE COPIES OF THE PLURALITY OF DATA QUERIES IN THE DATA STORE 706

CREATE A SCHEDULED TASK FOR THE QUERY PATTERN TO RETRIEVE PRE-RETRIEVED DATA FROM THE TARGET DATABASE 708

RETRIEVE, USING THE SCHEDULED TASK, THE PRE-RETRIEVED DATA FROM THE TARGET DATABASE AND STORING THE PRE-RETRIEVED DATA IN A CACHE SERVER 710

RECEIVE A SUBSEQUENT DATA QUERY FROM AN APPLICATION AFTER RETRIEVING THE PRE-RETRIEVED DATA 712

DETERMINE THAT THE SUBSEQUENT DATA QUERY MATCHES THE QUERY PATTERN 714

RETRIEVE THE PRE-RETRIEVED DATA CORRESPONDING TO THE SUBSEQUENT DATA QUERY FROM THE CACHE SERVER 716

SEND THE PRE-RETRIEVED DATA CORRESPONDING TO THE SUBSEQUENT DATA QUERY TO THE APPLICATION 718

IDENTIFY, USING A MACHINE LEARNING (ML) MODEL, A QUERY PATTERN FROM A PLURALITY OF HISTORICAL DATA QUERIES DIRECTED TO ONE OR MORE TARGET DATABASES, EACH OF THE PLURALITY OF HISTORICAL DATA QUERIES COMPRISES A PLURALITY OF PARAMETERS, WHEREIN AT LEAST ONE OF THE PLURALITY OF PARAMETERS COMPRISES A TEMPORAL RANGE TO RETRIEVE DATA CORRESPONDING TO A SPECIFIC PERIOD 602

RETRIEVE, ACCORDING TO THE QUERY PATTERN, PRE-RETRIEVED DATA FROM THE ONE OR MORE TARGET DATABASES AND STORING THE PRE-RETRIEVED DATA IN A CACHE SERVER 604

RECEIVE A SUBSEQUENT DATA QUERY FROM AN APPLICATION AFTER RETRIEVING THE PRE-RETRIEVED DATA 606

DETERMINE THAT THE SUBSEQUENT DATA QUERY MATCHES THE QUERY PATTERN 608

RETRIEVE THE PRE-RETRIEVED DATA CORRESPONDING TO THE SUBSEQUENT DATA QUERY FROM THE CACHE SERVER 610

SEND THE PRE-RETRIEVED DATA CORRESPONDING TO THE SUBSEQUENT DATA QUERY TO THE APPLICATION 612

FIG. 6

700

RECEIVE A PLURALITY OF DATA QUERIES FROM ONE OR MORE APPLICATIONS DIRECTED TO A TARGET DATABASE, EACH OF THE PLURALITY OF DATA QUERIES COMPRISES A PLURALITY OF PARAMETERS, WHEREIN AT LEAST ONE OF THE PLURALITY OF PARAMETERS COMPRISES A TEMPORAL RANGE TO RETRIEVE DATA CORRESPONDING TO A SPECIFIC PERIOD 702

↓

STORE A COPY OF EACH OF THE PLURALITY OF DATA QUERIES IN A DATA STORE 704

↓

IDENTIFY, USING A MACHINE LEARNING (ML) MODEL AND THE PLURALITY OF PARAMETERS, A QUERY PATTERN IN THE COPIES OF THE PLURALITY OF DATA QUERIES IN THE DATA STORE 706

↓

CREATE A SCHEDULED TASK FOR THE QUERY PATTERN TO RETRIEVE PRE-RETRIEVED DATA FROM THE TARGET DATABASE 708

↓

RETRIEVE, USING THE SCHEDULED TASK, THE PRE-RETRIEVED DATA FROM THE TARGET DATABASE AND STORING THE PRE-RETRIEVED DATA IN A CACHE SERVER 710

↓

RECEIVE A SUBSEQUENT DATA QUERY FROM AN APPLICATION AFTER RETRIEVING THE PRE-RETRIEVED DATA 712

↓

DETERMINE THAT THE SUBSEQUENT DATA QUERY MATCHES THE QUERY PATTERN 714

↓

RETRIEVE THE PRE-RETRIEVED DATA CORRESPONDING TO THE SUBSEQUENT DATA QUERY FROM THE CACHE SERVER 716

↓

SEND THE PRE-RETRIEVED DATA CORRESPONDING TO THE SUBSEQUENT DATA QUERY TO THE APPLICATION 718

FIG. 7

PATTERN RECOGNITION IN APPLICATION DATABASE QUERIES WITH SCHEDULED PRE-CACHED DATA RETRIEVAL

BACKGROUND

Telecommunication networks, such as cellular networks, have various resources that produce data and metadata concerning operations of the cellular network. Metadata is data that provides information about data. Metadata enriches the data with information about one or more aspects of the data. Metadata insights can facilitate efficient processing and understanding the data. Status reports, including error codes, may be generated which are indicative of deficiencies in operations of the network. With the development of information technology, data to be used in different applications can be large in volume and complex in variety. The data can include a great quantity of diverse information from various data sources/data owners. With the development of communication technologies, such as fifth generation (5G) new radio (NR) cellular networks, applications supporting a massive number of connected devices are enabled. Such applications can be based on data from myriad sources, including third party sources. Obtaining insight of the data can be important to create and capture value from the data, for example, to develop data products.

The 5G NR cellular networks being cloud-native architectures have created a very vast opportunity to use the data from the network to create service-level agreement (SLA) driven network of networks, private networks, etc. There are opportunities to bring the value from data that is generated by the 5G NR cellular network, given that the cellular network can be an open, secure, flexible, cloud-native network. 5G NR cellular networks now have the capability to build intelligence at every cell tower, at various network tiers from National Data Center, Regional Data Center, Edge Data centers including the Cell Sites. All the components that are software driven can use this opportunity. However, with this opportunity, telecommunication companies will have enormous amounts of data at hand that can lead to automation, orchestration with infinite intelligence driven from the network. This can be monetized with enterprise customers.

In applications that gather data from databases for time-related reports, users often query data to review the previous week or day. These initial queries can lead to additional queries that depend on the values retrieved, and the variability in these follow-up queries can be significant. Throughout the day and across different projects, users exhibit distinct querying patterns. Processing all of these queries can be time-consuming for the database, leading to considerable delays.

In addition, there can be a lot of queries to a database. And these queries may not necessarily come from human users. For example, there can be applications, such as report generators, that generate reports. These report generators can be on-demand based on a user's needs. As described above, all of these queries that come to the database are going to take some time to retrieve the data. However, this whole process of querying the database to generate a report is performed on-demand in response to a request from a user.

BRIEF DESCRIPTION OF DRAWINGS

The present disclosure is illustrated by way of example, and not by way of limitation, in the figures of the accompanying drawings.

FIG. 6 is a flow diagram of a method for pre-retrieving data for a data query that matches an identified query pattern according to at least one embodiment.

FIG. 7 is a flow diagram of a method for pre-retrieving data using an identified query pattern according to at least one embodiment.

DETAILED DESCRIPTION

As described above, processing queries for time-related reports can be time-consuming for a database, leading to considerable delays. Aspects and embodiments of the present disclosure overcome these deficiencies and others by providing a machine learning (ML) system that detects query patterns and pre-processes the relevant data, storing it on a cache server. The ML system can store all queries sent to the database in a data source. The ML system can analyze these queries to detect patterns based on temporal ranges (e.g., date ranges, time ranges, or both) and other query parameters. If a pattern is identified, the ML system can create a scheduled task for the database to retrieve the relevant data in advance and store it in a cache server. This ensures that when similar queries are made, the pre-processed data is already available, reducing query time. A detection algorithm of the ML system can continuously learn from user behavior and adapt by storing the pre-processed data in the cache server. Ultimately, this approach will significantly reduce query response times for those queries that follow identifiable patterns.

Aspects and embodiments of the present disclosure can recognize the pattern of these data queries and try to proactively obtain the data before it is requested. The data can be stored somewhere, such as a cache server, where the data can be retrieved much faster than querying the target database. By doing so, routine queries or queries from report generators to the database can be done much faster, saving time for the users.

Figure 1:
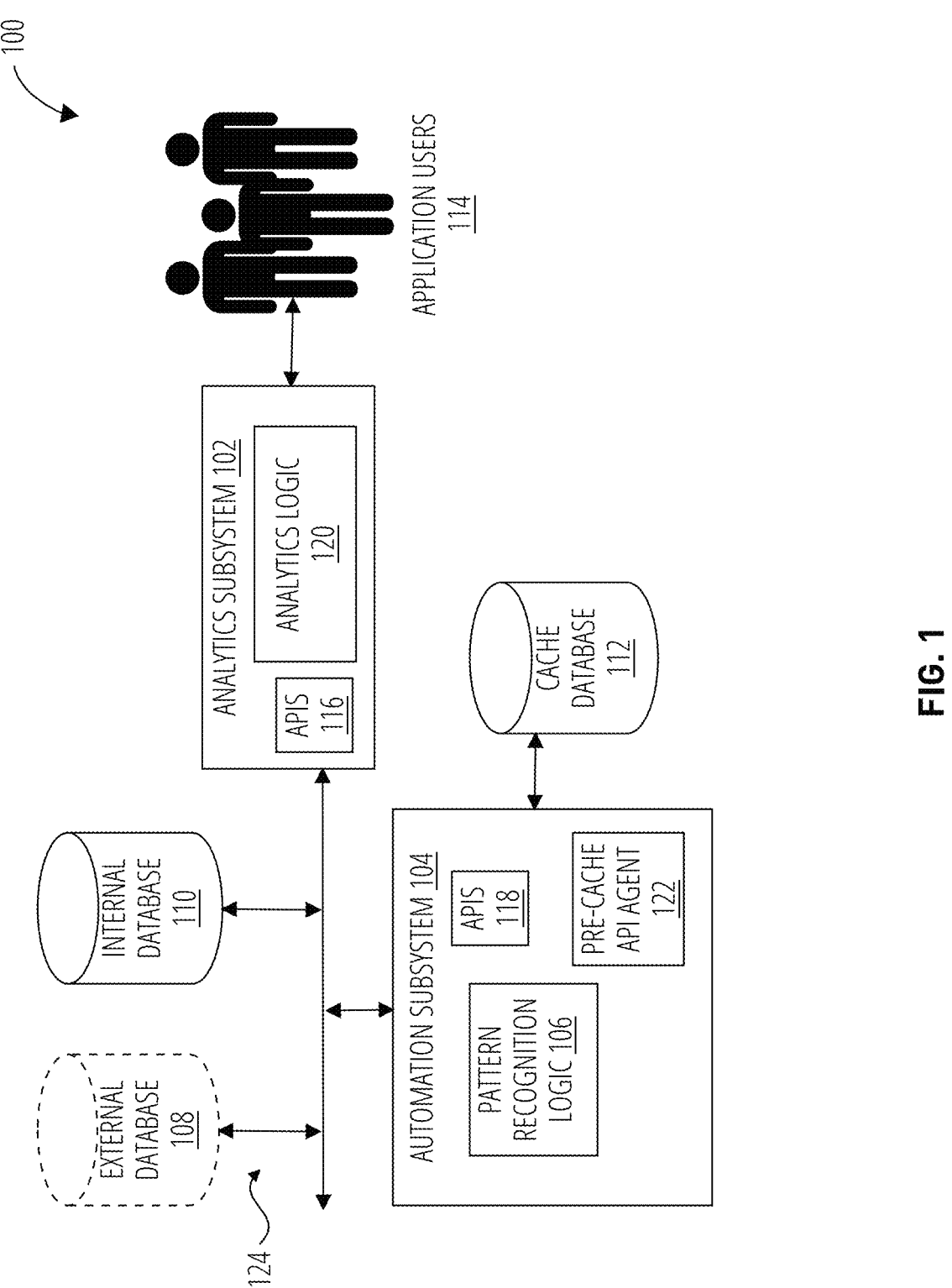
FIG. 1 is a block diagram of an automation and analytics platform with an analytics subsystem and an automation subsystem with pattern recognition logic according to at least one embodiment.

FIG. 1 is a block diagram of an automation and analytics platform 100 with an analytics subsystem 102 and an automation subsystem 104 with pattern recognition logic 106 according to at least one embodiment. The automation and analytics platform 100 includes an analytics subsystem 102, an automation subsystem 104, an internal database 110, and a cache database 112. The automation and analytics platform 100 can access data in an external database 108.

In at least one embodiment, the analytics subsystem 102 is a web application that allows an application user 114 to get data from different data sources (referred to herein as target databases), such as external database 108 and internal database 110, and perform analytics on-demand in response to a request from an application user 114. That is, the analytics subsystem 102 can communicate with the external database 108, the internal database 110, and the automation subsystem 104. As described above, data queries by the analytics subsystem 102 to the external database 108 can take time and can create a bottleneck in generating analytics.

In at least one embodiment, the automation subsystem 104 is an automation process that can communicate with the analytics subsystem 102, the external database 108, the internal database 110, and the cache database 112. The automation subsystem 104 operates in parallel to the analytics subsystem 102, and can perform different jobs. The automation subsystem 104 can include pattern recognition logic 106. The automation subsystem 104 can include one or more processing nodes that can implement the pattern recognition logic 106 to identify query patterns made by the analytics subsystem 102 to the external database 108. The functionality of the pattern recognition logic 106 is described in more detail below. In at least one embodiment, the automation subsystem 104 can be equipped with one or more ML models that performs some analysis beyond a legacy algorithm of the analytics subsystem 102, such as providing some insights on the data. The one or more ML models can be used to identify query patterns for retrieving data before it is requested by the analytics subsystem 102. The automation subsystem 104 can put the pre-retrieved data (and insights) in a location where it is ready for the analytics subsystem 102 (i.e., the web application). The automation subsystem 104 can store the pre-retrieved data in the cache database 112. In other embodiments, the automation subsystem 104 can include other types of data stores to cache the pre-retrieved data.

As described above, significant delays can occur when accessing data in the external database 108, causing a bottleneck in generating analytics of the data. The pattern recognition logic 106 can help reduce these significant delays as described in more detail below.

In at least one embodiment, the analytics subsystem 102 includes a set of application programming interfaces (APIs) 116 that can be used to access data in the external database 108 using API calls (also referred to as API requests). The automation subsystem 104 includes a set of APIs 118 that can also be used to access data in the external database 108 using API calls (or API requests). In general, the pattern recognition logic 106 can proactively recognize the types of different queries that are coming from the application users 114. Once one or more query patterns have been identified by the pattern recognition logic 106, the automation subsystem 104 can retrieve pre-retrieved data from the external database 108 and store it in the cache database 112 before receiving subsequent data queries that match the identified patterns. Now, instead of retrieving data for a subsequent data query from the external database 108, the pre-retrieved data can be retrieved from the cache database 112 quicker. That is, the subsequent data query does not go to the external database 108, rather it goes to the cache database 112. The automation subsystem 104 can intercept the API call and redirect the API call to the cache database 112.

In at least one embodiment, an application user 114 can make a request for data from the analytics subsystem 102. The analytics subsystem 102 generates an API request to retrieve the data. Before the API request is sent to the external database 108, the pattern recognition logic 106 can determine that the API request matches a query pattern. When the API request matches a query pattern, the automation subsystem 104 can redirect the API request to the cache database 112 instead, since this data has already been pre-retrieved from the external database 108.

Figure 2:
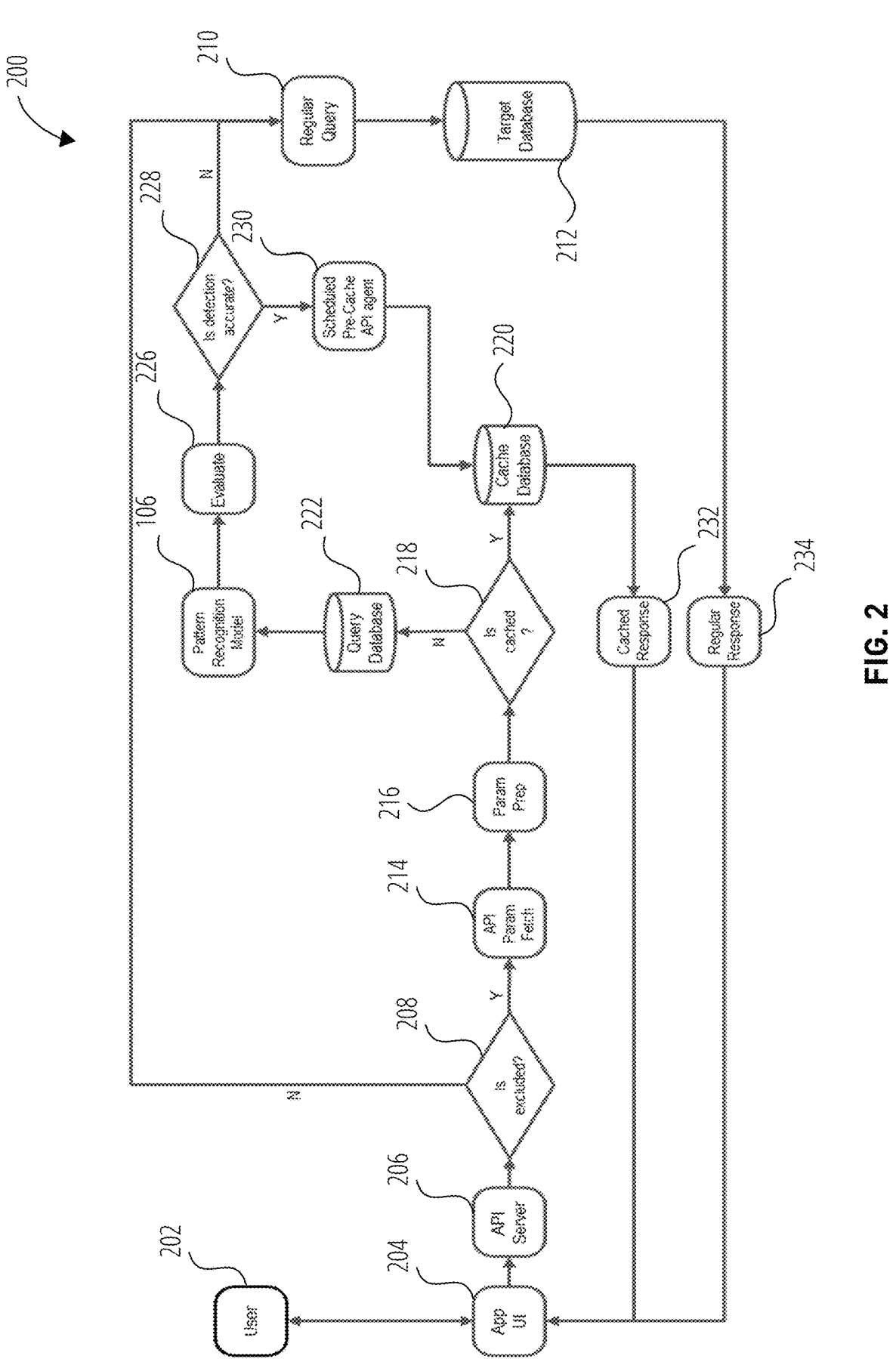
FIG. 2 illustrates an aspect of the subject matter in accordance with one embodiment.

FIG. 2 is a flow diagram of an automation process 200 for data queries to a target database according to at least one embodiment. In the automation process 200, a user 202 uses an application user interface (UI) 204 of an API server 206 to make one or more data queries. Although illustrated as a user 202, the data queries can be made by a process, a machine, a virtual machine, a service, or the like. In at least one embodiment, the process is an application, such as a report generator that generates automated time-related reports. The API server 206 receives the one or more data queries and determines whether any of the data queries are to be excluded from being cached (block 208). For example, queries related to authentication or other sensitive data can be excluded from being cached for security or privacy reasons. For another example, some types of queries can have a small latency already and these queries can be excluded from being cached. In at least one embodiment, the API server 206 can maintain a list of query types that are excluded or a list of query types that should be cached.

If the data query is to be excluded, the API server 206 makes a regular query 210 to the target database 212, and sends a regular response 234 back to the user 202 via the application UI 204. If the data query is not to be excluded, the automation process 200 performs an API parameter fetch 214 and a parameter preparation 216 before determining if the data query is cached (block 218). When calling an API, an API call can have a long list of parameters. Parameters are pieces of information, included in a query or request, that specify filters or other details about the query. They can be sent in various ways, such as in a query string, a URL path, headers, or request body. Some parameters help customize a request and provide the necessary context for the API server 206 to process it correctly. Some of these parameters are going to have an impact on the response, whereas some of these parameters are not going to have much of an impact on the response. For example, tokens are not going to change anything with the response, but identify which user is trying to access the data. For another example, any parameters related to the filtering of the data are going to be very impactful on the response. One of these parameters is a time parameter. Often a time parameter specifies a temporal range, such as a date range, a time range, or both. The temporal range can encompass any period defined by specific start and end points, whether they are dates, times, or a combination of both. Temporal ranges can be applied in various contexts where a period needs to be specified for data retrieval and analysis. For example, a user can request yesterday's data, so it can be from 12 PM two days ago to 12 PM yesterday. A similar request can be made for 1 AM, which could include two days ago to 1 AM yesterday. These two data queries can have a lot of similarity to each other. So, if a user is asking for yesterday's data with the second API call mentioned, these two requests are going to be very similar to each other. So, if the automation process 200 can send the cached information for the first data query, which is very close to the second one, the user 202 is likely to get similar data, despite the minor differences in the data queries. So, the similarity check between data queries can be performed at block 218 because of the different time parameters. It should be noted that the cache database 220 may not be useful if specific and exact times are used because it cannot be determined the exact time that the users are looking for. However, the pattern recognition logic 106 can look for similarities and say that the timing is likely going to be like this, but not exactly. So, the automation process 200 can perform the API parameter fetch 214 and parameter preparation 216 to exclude some of the parameters that are not likely going to have an impact on the response and try to find something very close to what the user 202 just asked for. In at least one embodiment, the automation process 200 can have a list of optional functions available to prepare each parameter. These functions can be applied based on defined selections. For example, the functions can include the following examples:

1 Convert to another data type
    #2 Remove if Null
    #3 Fill avg if null
    #4 Remove If not in the defined list For the available parameter, the parameter preparation 216 can apply the functions as set forth in the following example:

| Weighted & Filtered Parameters: | |
|---|---|
| KPI_Name | #4 |
| Object | #2 |
| Time diff. | #1 & #3 |
| Granularity | #4 |
| Filter Object Type | #4 |
| Filter Object List | #2 |

In at least one embodiment, the pattern recognition logic 106 can use one or more machine learning (ML) models. There are several types of ML models that are commonly used to detect patterns in data. The ML model can be any type of model used to recognizing patterns, such as statistical models, neural networks, deep learning models, clustering algorithms, decision trees and random forests, regression models, classification models, or the like. The statistical models can include linear regression or logistic regression, which are used to identify relationships between variables and predict outcomes based on those relationships. Neural networks, which include layers of interconnected nodes, are models that are particularly effective for pattern recognition tasks. Recurrent Neural Networks (RNN) can be used for time series predictions. Deep Learning models are a subset of neural networks. Deep learning models have multiple layers that allow them to learn complex patterns in large datasets. Clustering algorithms, such as k-means and hierarchical clustering, group similar data points together based on their features. Decision Trees and Random Forests are used for classification and regression tasks. They work by splitting the data into subsets based on feature values and making predictions based on the majority class or average value in each subset. To detect patterns in data queries that include temporal ranges, there are several types of machine learning models, such as unsupervised or supervised behavior models, pattern recognition models, etc. Unsupervised behavior models can be trained to monitor and detect patterns and anomalous patterns in user behavior. They can be fine-grained and unsupervised, making them suitable for analyzing temporal ranges in data queries. Pattern recognition models can be used for recognizing patterns in application database queries with scheduled pre-cached data retrieval. They can be particularly useful for detecting temporal patterns in data queries.

In at least one embodiment, once the API server 206 receives a request (data query), it processes it based on the specified endpoint and parameters. This can involve several steps, including routing, validation, execution, and response. The routing can be determined based on whether the data is already cached or not, such as described herein. The API server 206 can determine which endpoint (target database 212 or cache database 220) the request is targeting and routes it to the appropriate handler or function. The API server 206 can check the parameters to ensure they are valid and meet the required criteria. As described above, the API server 206 can determine if the query should be excluded from the remaining process involving caching and pattern recognition logic 106. The API server 206 can also perform the API parameter fetch 214 and parameter preparation 216 for determining whether the data query matches an identified pattern and its data has already been cached in the cache database 220. The API server 206 can execute the corresponding function or operation of querying either the target database 212 or the cache database 220, performing calculations, or interacting with other services to fulfill the data query. After processing the request, the API server 206 can generate a response (e.g., either the regular response 234 or cached response 232), which typically includes the requested data or a confirmation of the action taken. This response is then sent by the API server 206 back to the user 202, such as via the application UI 204.

In at least one embodiment, the API parameter fetch 214 and the parameter preparation 216 can be performed by an API prompter that determines whether the data query matches one of the query patterns that has been cached in the cache database 220. Once the parameters for the data query have been fetched and prepared, these parameters are used to determine whether the cache database 220 and the pre-retrieved data is ready. If so, the automation process 200 is going to get the pre-retrieved data from the cache database 220 and send the pre-retrieved data in the cached response 232. If the data is cached, the response to the data query will be faster than making the regular query 210 to the target database 212. In at least one embodiment, the API server 206 can operate or act as an intermediary that receives requests from users (or processes, machines, services, etc.), processes them according to the defined endpoints and parameters, and returns the appropriate responses. The API server 206, however, also includes the capability of determining whether the data has been pre-retrieved using identified query patterns, identified by the pattern recognition logic 106. This process allows users (or processes, machines, services, etc.) to interact with the underlying data and services in a structured and efficient manner.

As described above, all of the data queries (API calls) are stored in the query database 222. The pattern recognition model 224 can start to detect any pattern in these stored data queries. The pattern recognition model 224 can focus on the timings and comparing them to the current time to find any relation between the data queries. For example, users in a specific area can be looking for some kind of data or using some kind of APIs for the last N number of days. This is something that can be recognized by the pattern recognition model 224. So, if the pattern recognition model 224 can recognize a query pattern, some evaluation checks can be done at block 226. If determined to be accurate, the pre-cache API agent at block 230 can generate a scheduled task to perform the API calls proactively at a specified time so that the data can be pre-retrieved and stored in the cache database 220 before a subsequent data query is made for this data. For example, when a user requests data the next day, the cache database 220 already stores the pre-retrieved data for the request. It should be noted that the pattern recognition model 224 can make everything relative to the current time. For example, a data query can be changed to a user asking for 8-hours ago data, so that is set in the scheduled pre-cache API agent so that the API agent can determine that the data is going to be ready 6 hours ago, so it will schedule it accordingly. It should be noted that the pattern recognition logic 106 may need to convert specific temporal ranges in data queries into relative temporal ranges given that the subsequent data queries will be at a future time. In this manner, the scheduled tasks generated by the pre-cache API agent 122 can be relative to a future current time of the subsequent data query. For example, temporal ranges that specify an absolute time in the system may need to be converted to temporal ranges like "a week ago" or "two days ago" or "last week" or "yesterday" or other timing that is relative to a current time of a subsequent data query. It should also be noted that the pattern recognition logic 106 can have an ML model per user, per organization, per application, or any combination thereof. The pattern recognition logic 106 can use multiple ML models to identify query patterns of the API calls. In other embodiments, the pattern recognition logic 106 uses deterministic algorithms that are not necessarily ML model based.

In at least one embodiment, the pattern recognition logic 106 can determine if the incoming data query matches one of the query patterns identified by the ML model (e.g., pattern recognition model 224), as described in more detail below. If the data query matches (i.e., is cached), the automation process 200 sends the data query to a cache database 220, and sends a cached response 232 back to the user 202 via the application UI 204.

If it is determined that the data query is not cached at block 218, the automation process 200 stores a copy of the query in a query database 222. The automation process 200 can send the regular query 210 to the target database 212. A copy of each of the data queries to the target database 212 can be stored in the query database 222. A pattern recognition model 224 can access the copies of the data queries stored in the query database 222 to identify one or more query patterns. Once a query pattern is identified by the pattern recognition model 224, the automation process 200 can evaluate the identified query pattern (block 226) and determine whether the identified query pattern is accurate (block 228). If the identified query pattern is determined to not be accurate at block 228, the automation process 200 can send the regular query 210 to the target database, which sends the regular response 234 back to the application UI 204. If the identified query pattern is determined to be accurate at block 228, the automation process 200 can schedule a pre-cache API agent (block 230) to query the target database 212 to retrieve pre-retrieved data and store the pre-retrieved data in the cache database 220. Thus, when a subsequent data query matches the identified query pattern (i.e., is matched at block 218), the cached response 232 with the pre-retrieved data can be sent back to the application UI 204, instead of making the regular query 210 to the target database 212.

Figure 3:
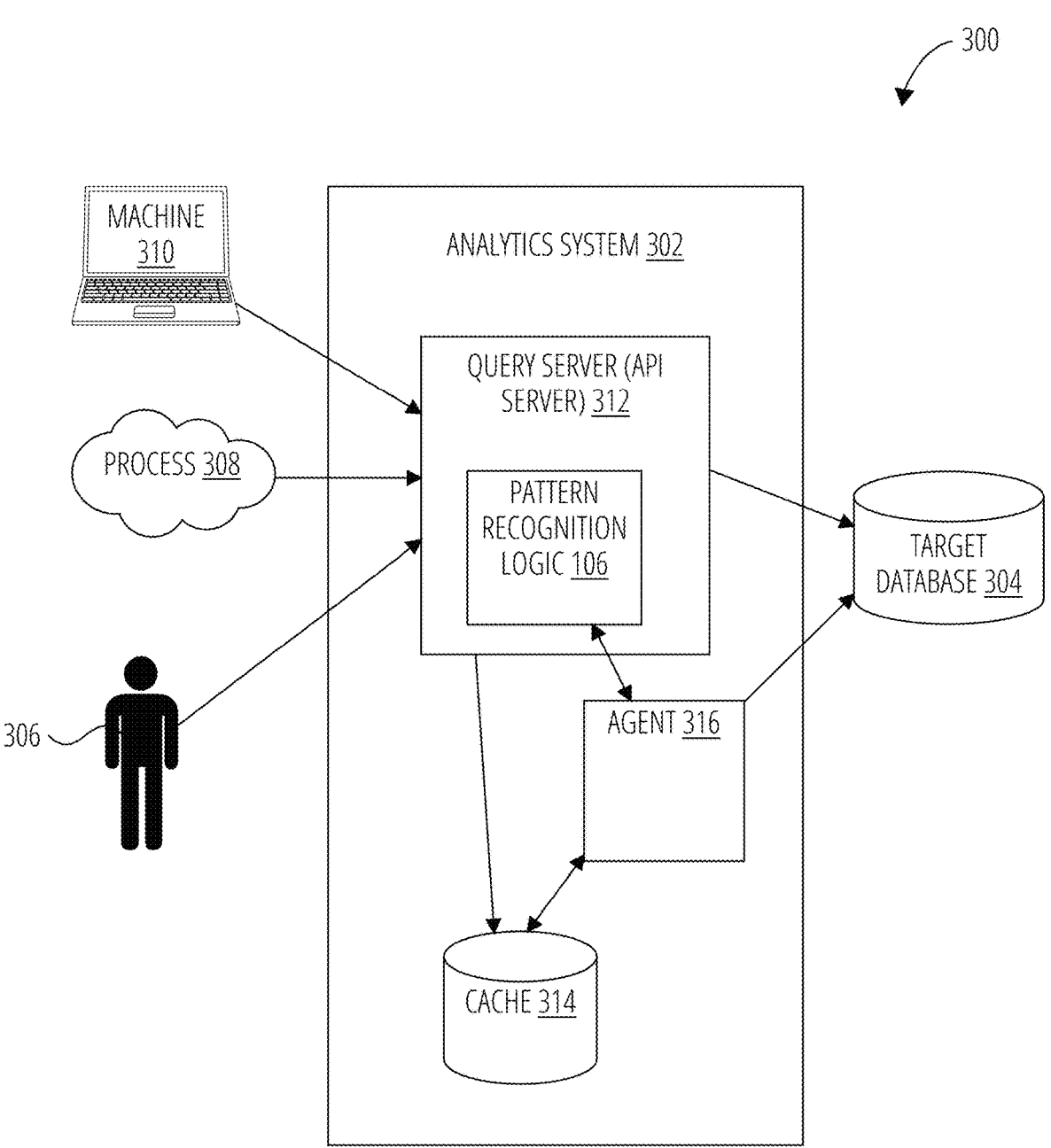
FIG. 3 is a block diagram of a computing system with a query server to access a target database, the query server including the pattern recognition logic according to at least one embodiment.

FIG. 3 is a block diagram of a computing system 300 with a query server 312 to access a target database, the query server 312 including the pattern recognition logic 106 according to at least one embodiment. The computing system 300 includes an analytics system 302 and a target database 304. The analytics system 302 can be accessed by a user 306, a process 308, a machine 310. The machine 310 can be a physical machine or a virtual machine. In at least one embodiment, the analytics system 302 can be accessed by a service. In at least one embodiment, the process 308 is an application. The application can be a report generator that generates automated time-related reports using pre-retrieved data corresponding to an identified query pattern. The analytics system 302 includes a query server 312 that can receive queries from the user 306, the process 308, and the machine 310. The query server 312 can be an API server that receives API calls from the user 306, the process 308, and the machine 310. The following description describes the data queries coming from the user 306, but in other embodiments, the data queries can originate from other sources, such as the process 308, the machine 310, or the like. In this embodiment, the analytics system 302 includes a query server 312, a cache 314, and an agent 316. In another embodiment, the query server 312, the cache 314, and the agent 316 can be part of a database system, an application, an application database system, or other systems that access data in the target database 304. The target database 304 can be part of the same computing system as the analytics system 302, but can also be a separate system that is accessed over a public or private network.

As described above, the pattern recognition logic 106 can perform pattern recognition in application database queries with scheduled pre-cached data retrieval. In applications that gather data from the target database 304 for time-related reports, the user 306 (or process 308 or machine 310) often queries data to review the previous week or day or other specified time period. These initial queries can lead to additional queries that depend on the values retrieved, and the variability in these follow-up queries can be significant. Throughout the day and across different projects, one or more users 306 can exhibit distinct querying patterns. Processing all of these queries can be time-consuming for the target database 304, leading to considerable delays (referred to herein as database performance bottlenecks). The pattern recognition logic 106 aims to detect such patterns and pre-process the relevant data using the agent 316, storing the relevant data for a subsequent data query in the cache 314. As a result, when the user 306 executes queries that match the recognized patterns, the user 306 can access already processed data without waiting for the target database 304. A detection algorithm of the pattern recognition logic 106 can continuously learn from user behavior and adapt by storing the pre-retrieved data (also referred to as pre-processed data) in the cache 314. Ultimately, this approach will significantly reduce query response times for those queries that follow identifiable patterns, reducing the database performance bottlenecks for retrieving data from the target database 304.

During operation, the analytics system 302 can send the data queries to the target database 304 to retrieve data from the target database 304. In some cases, the query server 312 sends the data queries to the target database 304 to retrieve the data being requested. In other cases, an agent 316 can send the data queries to the target database 304 to pre-retrieve data according to the pattern recognition logic 106. The pattern recognition logic 106 can be part of the query server 312. The pattern recognition logic 106 can store copies of the data queries being made to the target database 304 and identify a query pattern from the copies of the data queries. When the pattern recognition logic 106 identifies a query pattern, the pattern recognition logic 106 can coordinate with the agent 316 to schedule a task to retrieve pre-retrieved data from the target database 304 and store the pre-retrieved data in a cache 314. The pattern recognition logic 106 can coordinate with the agent 316 to send data queries for the identified query pattern in anticipation of subsequent data queries. When a subsequent data query matches the identified query pattern, the query server 312 can retrieve the pre-retrieved data from the cache 314, instead of the target database 304.

In at least one embodiment, the pattern recognition logic 106 can store all data queries sent to the target database 304 in a data source. This data source can be part of the cache 314 or can be a separate data store that is accessible by the pattern recognition logic 106. In at least one embodiment, the pattern recognition logic 106 includes one or more ML models that can analyze these stored queries to detect patterns based on time ranges and other parameters of the data queries. If a pattern is identified by the one or more ML models, the pattern recognition logic 106 can create one or more scheduled tasks to retrieve the relevant data in advance from the target database 304 and store it in the cache 314. In at least one embodiment, the cache 314 can be implemented in a separate cache server that is communicatively coupled to the query server 312 (or the analytics system 302). This ensures that when the user 306 (or other users) makes similar queries, the pre-processed data is already available in the cache 314, reducing query time.

Figure 4:
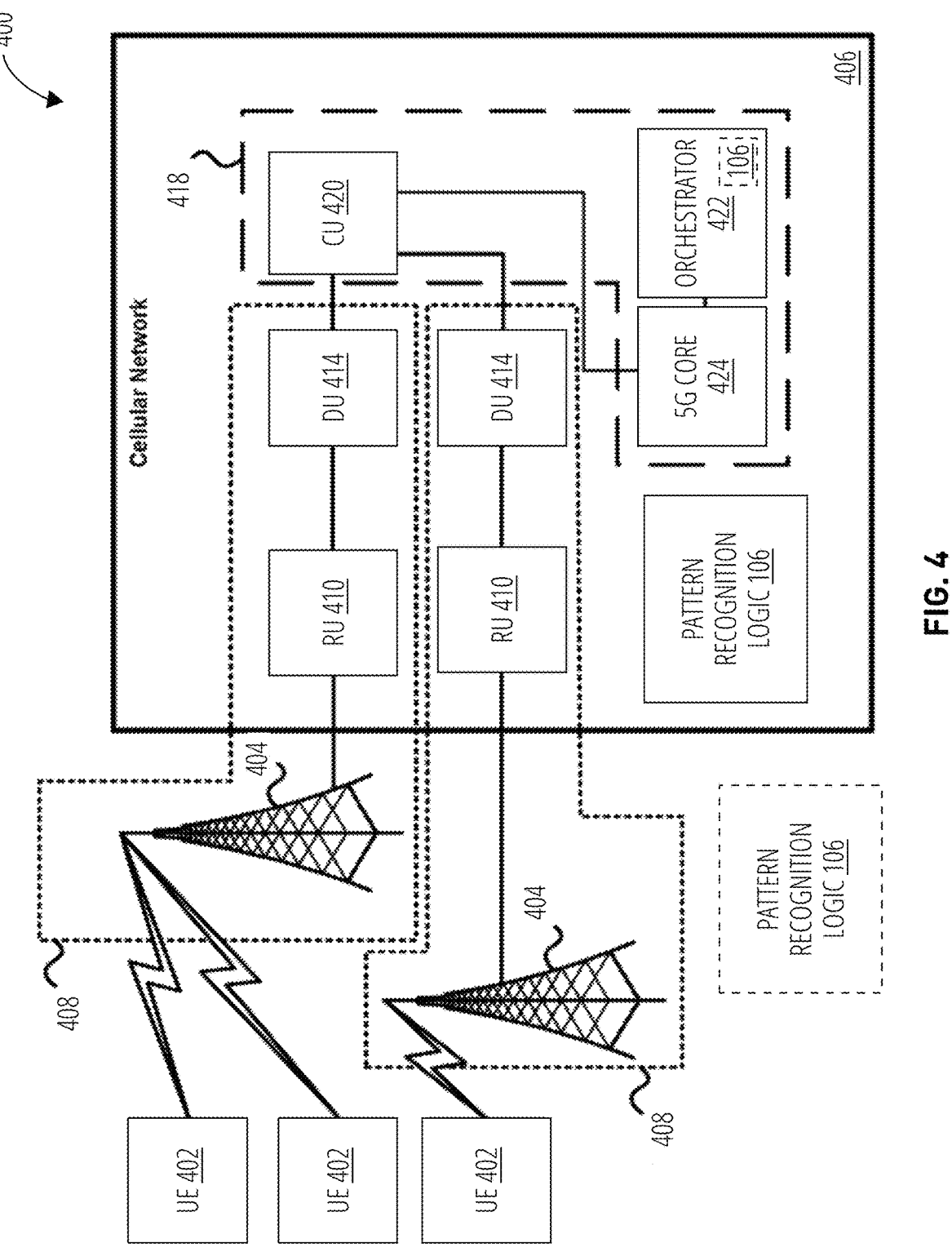
FIG. 4 is a block diagram of a system implementing pattern recognition logic in a cellular network according to at least one embodiment.

FIG. 4 is a block diagram of a cellular network system 400 ("system 400") implementing a pattern recognition logic 106 in a cellular network according to at least one embodiment. FIG. 4 represents an embodiment of a cellular network which can accommodate the cloud-based architecture. System 400 can include a 5G New Radio (NR) cellular network; other types of cellular networks, such as 6G, 7G, etc. may also be possible. System 400 can include: UEs 402; base station structure 404 including base station equipment (i.e., base station 408); cellular network 406; radio units 410 ("RUs 410"); distributed units 414 ("DUs 414"); centralized unit 420 ("CU 420"); 5G core 424, and orchestrator 422. FIG. 4 represents a component-level view. In an open radio access network (O-RAN), because components can be implemented as specialized software executed on general-purpose hardware, except for components that need to receive and transmit radio frequency (RF), the functionality of the various components can be shifted among different servers. For at least some components, the hardware may be maintained by a separate cloud-service provider, to accommodate where the functionality of such components is needed.

UE 402 can represent various types of end-user devices, such as cellular phones, smartphones, cellular modems, cellular-enabled computerized devices, sensor devices, gaming devices, access points (APs), any computerized device capable of communicating via a cellular network, etc. Generally, UE can represent any type of device that has an incorporated 5G interface, such as a 5G modem. Examples can include sensor devices, Internet of Things (IoT) devices, manufacturing robots; unmanned aerial (or land-based) vehicles, network-connected vehicles, etc. Depending on the location of individual UEs, UE 402 may use RF to communicate with various base stations of cellular network 406. As illustrated, two base stations are illustrated: base station 408 can include: base station structure 404, RU 410, and DU 414. Base station structure 404 may be any structure to which one or more antennas (not illustrated) of the base station are mounted. Base station structure 404 may be a dedicated cellular tower, a building, a water tower, or any other human-made or natural structure to which one or more antennas can reasonably be mounted to provide cellular coverage to a geographic area. Similarly, base station 408 can include: base station structure 404, RU 410, and DU 414.

Real-world implementations of system 400 can include many (e.g., thousands) of base stations and many CUs and 5G core 424. Base station Structure 404 can include one or more antennas that allow RUs 410 to communicate wirelessly with UEs 402. RUs 410 can represent an edge of cellular network 406 where data is transitioned to wireless communication. The radio access technology (RAT) used by RU 410 may be 5G New Radio (NR), or some other RAT. The remainder of cellular network 406 may be based on an exclusive 5G architecture, a hybrid 4G/5G architecture, a 4G architecture, or some other cellular network architecture. Base station 408 may include an RU 410 and a DU 414.

One or more RUs 410 may communicate with DU 414. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. One or more DUs 414 may communicate with CU 420. Collectively, an RU, DU, and CU create a gNodeB, which serves as the radio access network (RAN) of cellular network 406. CU 420 can communicate with 5G core 424. The specific architecture of cellular network 406 can vary by embodiment. Edge cloud server systems outside of cellular network 406 may communicate, either directly, via the Internet, or via some other network, with components of cellular network 406. For example, DU 414 may be able to communicate with an edge cloud server system without routing data through CU 420 or 5G core 424. Other DUs may or may not have this capability.

While FIG. 4 illustrates various components of cellular network 406, other embodiments of cellular network 406 can vary the arrangement, communication paths, and specific components of cellular network 406. While RU 410 may include specialized radio access componentry to enable wireless communication with UE 402, other components of cellular network 406 may be implemented using either specialized hardware, specialized firmware, and/or specialized software executed on a general-purpose server system. In an O-RAN arrangement, specialized software on general-purpose hardware may be used to perform the functions of components such as DU 414, CU 420, and 5G core 424. Functionality of such components can be co-located or located at disparate physical server systems. For example, certain components of 5G core 424 may be co-located with components of CU 420.

In a possible virtualized O-RAN implementation, CU 420, 5G core 424, and/or orchestrator 422 can be implemented virtually as software being executed by general-purpose computing equipment, such as in a data center of a cloud-computing platform, as detailed herein. Therefore, depending on needs, the functionality of a CU, and/or 5G core may be implemented locally to each other and/or specific functions of any given component can be performed by physically separated server systems (e.g., at different server farms). For example, some functions of a CU may be located at a same server facility as where the DU is executed, while other functions are executed at a separate server system. In the illustrated embodiment of system 400, cloud-based cellular network components 418 include CU 420, 5G core 424, and orchestrator 422. Such cloud-based cellular network components 418 may be executed as specialized software executed by underlying general-purpose computer servers. Cloud-based cellular network components 418 may be executed on a third-party cloud-based computing platform or a cloud-based computing platform operated by the same entity that operates the RAN. A cloud-based computing platform may have the ability to devote additional hardware resources to cloud-based cellular network components 418 or implement additional instances of such components when requested.

Kubernetes, or some other container orchestration platform, can be used to create and destroy the logical CU or 5G core units and subunits as needed for the cellular network 406 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. (Rather, processing and storage capabilities of the data center would be devoted to the needed functions.) When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 422. Orchestrator 422 can represent various software processes executed by underlying computer hardware. Orchestrator 422 can monitor cellular network 406 and determine the amount and location at which cellular network functions should be deployed to meet or attempt to meet service level agreements (SLAs) across slices of the cellular network.

Orchestrator 422 can allow for the instantiation of new cloud-based components of cellular network 406. As an example, to instantiate a new core function, orchestrator 422 can perform a pipeline of calling the core function code from a software repository incorporated as part of, or separate from, cellular network 406; pulling corresponding configuration files (e.g., helm charts); creating Kubernetes nodes/pods; loading the related core function containers; configuring the core function; and activating other support functions (e.g., Prometheus, instances/connections to test tools).

A network slice functions as a virtual network operating on cellular network 406. Cellular network 406 is shared with some number of other network slices, such as hundreds or thousands of network slices. Communication bandwidth and computing resources of the underlying physical network can be reserved for individual network slices, thus allowing the individual network slices to reliably meet defined SLA parameters. By controlling the location and amount of computing and communication resources allocated to a network slice, the quality of service (QOS) and quality of experience (QoE) for UE can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus, optimization between performance and cost is desirable.

Particular network slices may only be reserved in particular geographic regions. For instance, a first set of network slices may be present at RU 410 and DU 414, a second set of network slices, which may only partially overlap or may be wholly different from the first set, may be reserved at the other RU 410 and DU 414.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 414, CU 420, orchestrator 422, and 5G core 424 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

5G core 424, which can be physically distributed across data centers or located at a central national data center (NDC), can perform various core functions of the cellular network. 5G core 424 can include: network resource management components; policy management components; subscriber management components; and packet control components. Individual components may communicate on a bus, thus allowing various components of 5G core 424 to communicate with each other directly. 5G core 424 is simplified to show some key components. Implementations can involve additional other components.

Network resource management components can include network repository function (NRF) and network slice selection function (NSSF). NRF can allow 5G network functions (NFs) to register and discover each other via a standards-based application programming interface (API). NSSF can be used by access and mobility management function (AMF) to assist with the selection of a network slice that will serve a particular UE.

Policy management components can include charging function (CHF) and policy control function (PCF). CHF allows charging services to be offered to authorized network functions. Converged online and offline charging can be supported. PCF allows for policy control functions and the related 5G signaling interfaces to be supported.

Subscriber management components can include unified data management (UDM) and authentication server function (AUSF). UDM can allow for generation of authentication vectors, user identification handling, NF registration management, and retrieval of UE individual subscription data for slice selection. AUSF performs authentication with UE.

Packet control components can include access and mobility management function (AMF) and session management function (SMF). AMF can receive connection- and session-related information from UE and is responsible for handling connection and mobility management tasks. SMF is responsible for interacting with the decoupled data plane, creating, updating, and removing protocol data unit (PDU) sessions, and managing session context with the user plane function (UPF).

User plane function (UPF) can be responsible for packet routing and forwarding, packet inspection, QoS handling, and external PDU sessions for interconnecting with a data network (DN) (e.g., the Internet) or various access networks. Access networks can include the RAN of cellular network 406.

5G core 424 may reside on a cloud computing platform. While from a client's or user's point of view, the "cloud" can be envisioned as an ephemeral computing workspace that occupies no physical space, in reality, a cloud computing platform is an interconnected group of data centers throughout which computing and storage resources are spread. Therefore, data centers may be scattered geographically and can provide redundancy.

As illustrated in FIG. 4, the system 400 includes the pattern recognition logic 106 as described above with respect to FIG. 1 to FIG. 3. The pattern recognition logic 106 can be part of a data platform, which is a system or a suite of tools and technologies designed to manage, store, process, analyze, and/or visualize large volumes of data generated by the system 400. The data platform can be used by modern data-driven organizations, enabling them to harness the power of their data for various purposes, such as business intelligence, analytics, machine learning, and more. In general, the data platform includes components for data ingestion, data storage, data processing, data management, data integration, data analytics, machine learning (ML) and artificial intelligence (AI) platforms, data security, or the like. For example, a data ingestion component can use extract, transform, load (ETL) logic (tools or processes) that extract data from various sources, transform it into a suitable format, and load it into a storage system. The data ingestion component can be set up to stream real-time data from sources, such as Internet of Things (IoT) devices, transactional systems, or other network functions. The data platform can include data storage components, such as data lakes, data warehouses, database systems. Data lakes are large storage repositories that hold raw data in its native format until it is needed. Data warehouses is structured storage systems optimized for query performance and analytics, often storing cleaned and processed data. Database Systems can include both relational (e.g., SQL) and non-relational (e.g., NoSQL) databases for various data storage needs. The data processing components can handle batch processing, streaming processing, or the like. Batch processing can handle large volumes of data in batches, typically for tasks like reporting, data transformation, and aggregation. Stream processing can handle real-time processing of continuous data streams to support applications like real-time analytics and monitoring. Data management components can handle metadata management and data governance. The metadata management can include tools for managing metadata, which is data about data, including data catalogs, lineage, and governance. Data Governance can include policies and processes to ensure data quality, security, privacy, and compliance with regulations. Data integration components can provide application programming interfaces (APIs), data virtualization, etc. The APIs can be used for accessing and integrating data across different systems. Data Virtualization techniques can be used for abstracting and integrating data from various sources without moving it physically. The data analytics components can have Business Intelligence (BI) and advanced analytics tools and platforms for data reporting, visualization, and dashboards to support decision-making. Advanced analytics techniques, like data mining, predictive analytics, and statistical analysis, can be used to derive deeper insights. The ML/AI platforms can provide a model training platform for developing and training machine learning models using data stored in the platform, and a model deployment platform for deploying trained models into production environments for real-time or batch inference. Data security components can provide access control, encryption, etc. Access control mechanisms can be used for ensuring that only authorized users can access specific data. Encryption techniques can be used for protecting data both at rest and in transit to prevent unauthorized access and breaches. The data platform can consolidate data from various sources into a single platform, making it easier to manage and access. The data platform can support large-scale data storage and processing, accommodating growing data volumes and increasing complexity. The data platform can enable real-time data processing and analytics, allowing organizations to respond quickly to changing conditions. The data platform can facilitate collaboration across different departments and teams by providing a unified data environment. The data platform can implement data governance and quality control measures to ensure the accuracy and reliability of data. The data platform can provide organizations with the tools and insights needed to make informed, data-driven decisions. In summary, the data platform can provide the infrastructure and tools needed to manage, process, and analyze data effectively, enabling organizations to unlock the full potential of their data assets. The data platform can also provide business intelligence and reporting. The data platform can aggregate data from multiple sources to generate comprehensive reports and dashboards for business analysis. The data platform can provide real-time analytics. In particular, the data platform can monitor and analyze data streams in real-time to gain immediate insights and drive instant actions. The data platform can provide customer insights by analyzing customer data to understand behavior patterns, preferences, and trends to improve customer experience and loyalty. The data platform can implement predictive maintenance as well, such as using machine learning models to predict equipment failures and schedule proactive maintenance in industries like manufacturing and utilities.

As described herein, the data platform can be implemented in a cloud computing system, providing data storage, data warehousing, real-time data processing, analytic engines for large-scale data processing, ML/AI services, data flow for stream and batch processing, or other data services. The data platform can provide a web application, such as automation and analytics platform 100 of FIG. 1 or the analytics system 302 of FIG. 3, including the pattern recognition logic 106 as described above.

As illustrated in FIG. 4, the pattern recognition logic 106 can be implemented as a component in the cellular network 406. In other embodiments, the pattern recognition logic 106 can be implemented outside of the cellular network 406 as illustrated with the dashed block.

Figure 5:
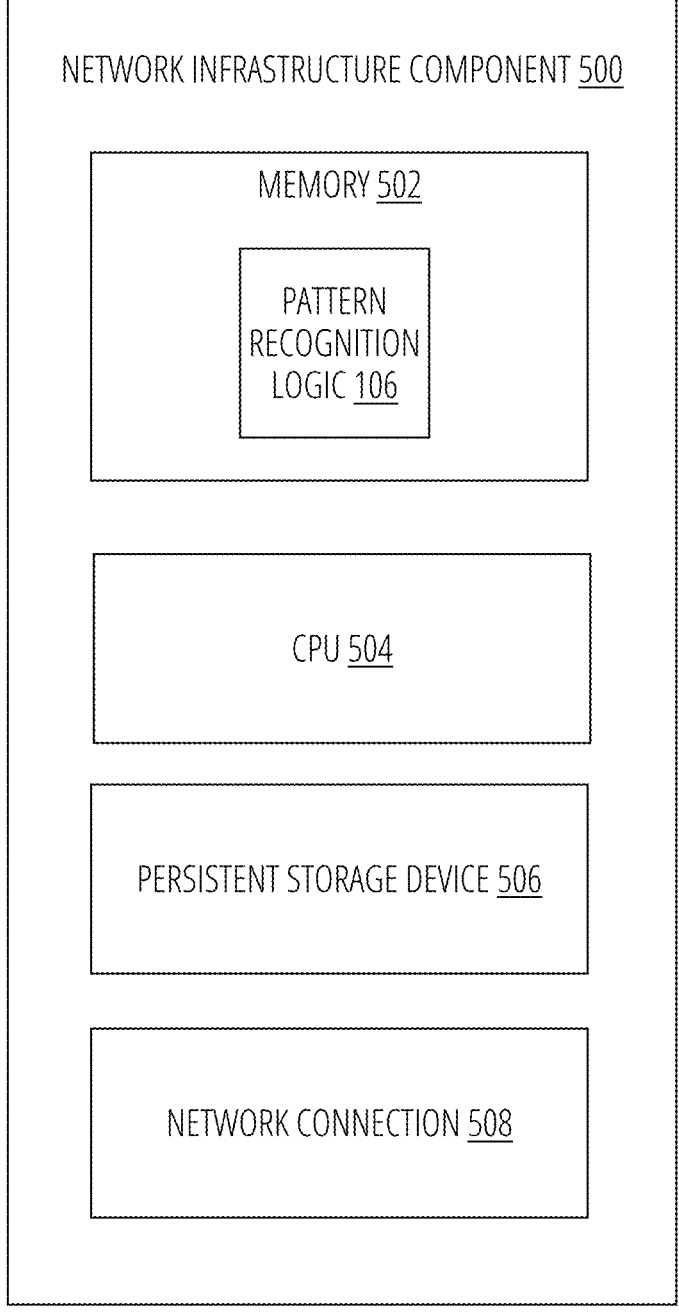
FIG. 5 is a block diagram depicting a network infrastructure component on which at least a portion of the pattern recognition logic may operate, according to at least one embodiment.

FIG. 5 is a block diagram depicting a network infrastructure component 500 on which at least a portion of the pattern recognition logic 106 may operate, according to at least one embodiment. The network infrastructure component 500 may be located on a network in a position to communicate with other network infrastructure components and user devices, in order to perform at least part of the functions required in managing a mobile network. A plurality of network infrastructure components may each implement a portion of the distributed data mesh system, thus distributing the system across a plurality of network infrastructure components. In various embodiments, the network infrastructure component 500 includes one or more of the following: a computer memory 502, a central processing unit (CPU) 504, a persistent storage device 506, and a network connection 508. The memory 502 may be used for storing programs and data while they are being used, including data associated with the various network infrastructure components, an operating system including a kernel (not shown), and device drivers (not shown). The CPU 504 may be used for executing computer programs (not shown). The persistent storage device 506 may be a hard drive or flash drive for persistently storing programs and data. The network connection 508 may be used for connecting to one or more network infrastructure components or other computer systems (not shown), to send or receive data, such as via the Internet or another network and associated networking hardware, such as switches, routers, repeaters, electrical cables and optical fibers, light emitters and receivers, radio transmitters and receivers, and the like, and to scan for and retrieve signals from network infrastructure components, or other network functions, and for connecting to one or more computer devices such as network infrastructure components or other computer systems. In various embodiments, the network infrastructure component 500 additionally includes input and output devices, such as a keyboard, a mouse, display devices, etc.

While a network infrastructure component 500 configured as described may be used in some embodiments, in various other embodiments, the network infrastructure component 500 may be implemented using devices of various types and configurations, and having various components. The memory 502 may include the pattern recognition logic 106 which contains computer-executable instructions that, when executed by the CPU 504, cause the network infrastructure component 500 to perform the operations and functions described herein. For example, the programs referenced above, which may be stored in computer memory 502, may include or be comprised of such computer executable instructions. The memory 502 may also include a network infrastructure component data structure. In another embodiment, one or more memories can store instructions that, when executed by one or more processors, causes the one or more processors to perform the operations and functions described herein.

In at least one embodiment, the pattern recognition logic 106 can be part of a data platform. The data platform performs the core functions of the network infrastructure component 500, as discussed herein. In particular, the data platform facilitates the management of creating, modifying, saving, and deploying executable code for collecting, processing, and storing data of a cellular network. The data platform can facilitate the management of data produced, consumed, stored, or otherwise used or accessible by consumers of the data. Additionally, the data platform may allow the network infrastructure controller to provide a microservice, data product, etc., to another network infrastructure controller, allow the network infrastructure controller to enforce data governance rules, perform audits, etc., of data produced by, stored on, used by, etc., other network infrastructure controllers, and perform other functions to manage the data platform as described herein.

In an example embodiment, the pattern recognition logic 106 can be implemented as hardware logic or computer-executable instructions stored on memory 502 of the network infrastructure component 500. The pattern recognition logic 106 can be implemented using standard programming techniques. For example, the computer executable instructions of the pattern recognition logic 106 stored on memory 502 of the network infrastructure component 500 may be implemented as a "native" executable running on CPU 504, along with one or more static or dynamic libraries. In other embodiments, the computer-executable instructions of the pattern recognition logic 106 stored on memory 502 of the network infrastructure component 500 may be implemented as instructions processed by a virtual machine that executes as some other program.

The embodiments described above may also use synchronous or asynchronous client-server computing techniques.

However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented or performed by each component/module, and in different orders, and by different components/modules, yet still achieve the functions of the network infrastructure component 500.

In addition, programming interfaces to the data stored as part of the pattern recognition logic 106 can be available by standard mechanisms such as through C, C++, C#, Java, and web APIs; libraries for accessing files, databases, or other data repositories; through scripting languages such as JavaScript and VBScript; or through Web servers, File Transfer Protocol (FTP) servers, or other types of servers providing access to stored data. The pattern recognition logic 106 may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of the network infrastructure component 500 and network infrastructure components.

Furthermore, in some embodiments, some or all of the components/portions of the pattern recognition logic 106, or functionality provided by the computer-executable instructions stored on memory 502 of the network infrastructure component 500 may be implemented or provided in other manners, such as at least partially in firmware or hardware, including, but not limited to, one or more application-specific integrated circuits (ASICs), standard integrated circuits, controllers (e.g., by executing appropriate instructions, and including microcontrollers or embedded controllers), field-programmable gate arrays (FPGAs), complex programmable logic devices (CPLDs), and the like. Some or all of the system components or data structures may also be stored as contents (e.g., as executable or other machine-readable software instructions or structured data) on a computer readable medium (e.g., as a hard disk; a memory; a computer network or cellular wireless network; or a portable media article to be read by an appropriate drive or via an appropriate connection, such as a DVD or flash memory device) so as to enable or configure a non-transitory computer-readable medium or one or more associated computing systems or devices to execute or otherwise use or provide the contents to perform at least some of the described techniques. The non-transitory computer-readable storage medium includes instructions that when executed by a computing system, cause the computing system to perform operations described herein. Such computer program products may also take other forms in other embodiments. Accordingly, embodiments of this disclosure may be practiced with other computer system configurations.

In general, a range of programming languages may be employed for implementing any of the functionality of the servers, functions, user equipment, etc., present in the example embodiments, including representative implementations of various programming language paradigms and platforms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

FIG. 6 is a flow diagram of a method 600 for pre-retrieving data for a data query that matches an identified query pattern according to at least one embodiment. The method 600 may be performed by processing logic that may comprise hardware (e.g., circuitry, dedicated logic, programmable logic, microcode, etc.), software (e.g., instructions run on a processor or a processing device to perform hardware simulation), or a combination thereof. In one embodiment, the method 600 is performed by the automation and analytics platform 100 or the automation subsystem 104 of FIG. 1. In at least one embodiment, the method 600 is performed by the computing system 300 or the analytics system 302 of FIG. 3. In at least one embodiment, the method 600 is performed by the pattern recognition logic 106 of FIG. 1 to FIG. 5. In one embodiment, the method 600 is performed by the network infrastructure component 500 of FIG. 5. The method 600 can be performed by other computing systems described herein.

Referring to FIG. 6, the method 600 begins with the processing logic identifying, using a machine learning (ML) model, a query pattern from a plurality of historical data queries directed to one or more target databases (block 602). Each of the plurality of historical data queries includes a plurality of parameters, where at least one of the plurality of parameters includes a temporal range to retrieve data corresponding to a specific period. At block 604, the processing logic retrieves, according to the query pattern, pre-retrieved data from the one or more target databases and stores the pre-retrieved data in a cache server. At block 606, the processing logic receives a subsequent data query from an application after retrieving the pre-retrieved data. At block 608, the processing logic determines that the subsequent data query matches the query pattern. At block 610, the processing logic retrieves the pre-retrieved data corresponding to the subsequent data query from the cache server. At block 612, the processing logic sends the pre-retrieved data corresponding to the subsequent data query to the application.

In a further embodiment, the processing logic can receive the plurality of historical data queries from one or more applications directed to the one or more target databases, and store a copy of each of the plurality of historical data queries in a data store. The processing logic, at block 602, can identify the query pattern by identifying, using the ML model and the plurality of parameters, the query pattern in the copies of the plurality of historical data queries in the data store. In at least one embodiment, the plurality of historical data queries received from one or more applications are API calls (or API requests) from the one or more application. Similarly, the subsequent data query can be a subsequent API call (or API request).

In at least one embodiment, the temporal range includes a time range, a date range, or a combination of both. Date range queries can filter data based on a specified start and end date. For example, if you want to retrieve sales data from Jan. 1, 2024, to Dec. 31, 2024, you could use a date range query to get all records within that period. Time range queries are similar to date range queries, but they focus on a specific time period within a day. For instance, if you need to analyze website traffic between 9:00 AM and 5:00 PM, a time range query will help you filter the data accordingly. There are also combined date and time range queries. These queries allow you to specify both date and time ranges. For example, you might want to retrieve data from Jan. 1, 2024, 9:00 AM to Jan. 31, 2024, 5:00 PM. Depending on the database or query language you are using, the syntax may vary. Common operators include BETWEEN, >=, <=, and AND. For example, in SQL, you might write:

SELECT*FROM sales WHERE sale date BETWEEN '2024 Jan. 1' AND '2024 Dec. 31';

In a further embodiment, the processing logic can identify, using the ML model and the plurality of parameters, a second query pattern in the copies of the plurality of historical data queries in the data store. The processing logic can create a second scheduled task for the second query pattern to retrieve second pre-retrieved data from the one or more target databases. The processing logic can retrieve, using the second scheduled task, the second pre-retrieved data from the one or more target databases and stores the second pre-retrieved data in the cache server. The processing logic can repeat this for additional query patterns identified.

In a further embodiment, the processing logic receives a second subsequent data query from a second application after retrieving the second pre-retrieved data. The processing logic determines that the second subsequent data query matches the second query pattern. The processing logic retrieves the second pre-retrieved data corresponding to the second subsequent data query from the cache server. The processing logic sends the second pre-retrieved data corresponding to the second subsequent data query to the second application. The processing logic can repeat this for other subsequent data queries that match any of the identified query patterns.

In at least one embodiment, the application is a report generator that generates automated time-related reports using the pre-retrieved data corresponding to the subsequent data query. In another embodiment, the application can be other processes. In other embodiments, the queries can be received from a user, a machine (physical or virtual), a service, or the like.

In at least one embodiment, the application is executed by a network component of a cellular network. In at least one embodiment, the application is executed in an automation and analytics platform associated with a cellular network. The automation and analytics platform includes the ML model. In at least one embodiment, the automation and analytics platform includes an automation subsystem with the ML model, and an analytics subsystem with the application. In at least one embodiment, the application is a web application associated with a cellular network.

FIG. 7 is a flow diagram of a method 700 for pre-retrieving data using an identified query pattern according to at least one embodiment. The method 700 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 700 is performed by the automation and analytics platform 100 or the automation subsystem 104 of FIG. 1. In at least one embodiment, the method 700 is performed by the computing system 300 or the analytics system 302 of FIG. 3. In at least one embodiment, the method 700 is performed by the pattern recognition logic 106 of FIG. 1 to FIG. 5. In one embodiment, the method 700 is performed by the network infrastructure component 500 of FIG. 5. The method 700 can be performed by other computing systems described herein.

Referring to FIG. 7, the method 700 begins with the processing logic receiving a plurality of data queries from one or more applications directed to a target database (block 702). Each of the plurality of data queries includes a plurality of parameters, where at least one of the plurality of parameters includes a temporal range to retrieve data corresponding to a specific period. At block 704, the processing logic stores a copy of each of the plurality of data queries in a data store. At block 706, the processing logic identifies, using a machine learning (ML) model and the plurality of parameters, a query pattern in the copies of the plurality of data queries in the data store. At block 708, the processing logic creates a scheduled task for the query pattern to retrieve pre-retrieved data from the target database. At block 710, the processing logic retrieves, using the scheduled task, the pre-retrieved data from the target database and stores the pre-retrieved data in a cache server. At block 712, the processing logic receives a subsequent data query from an application after retrieving the pre-retrieved data. At block 714, the processing logic determines that the subsequent data query matches the query pattern. At block 716, the processing logic retrieves the pre-retrieved data corresponding to the subsequent data query from the cache server. At block 718, the processing logic sends the pre-retrieved data corresponding to the subsequent data query to the application.

In at least one embodiment, the plurality of historical data queries received from one or more applications are API calls (or API requests) from the one or more application. Similarly, the subsequent data query can be a subsequent API call (or API request).

In at least one embodiment, the temporal range includes a time range, a date range, or a combination of both.

In at least one embodiment, the processing logic identifies, using the ML model and the plurality of parameters, a second query pattern in the copies of the plurality of data queries in the data store. The processing logic creates a second scheduled task for the second query pattern to retrieve second pre-retrieved data from the target database. The processing logic retrieves, using the second scheduled task, the second pre-retrieved data from the target database and stores the second pre-retrieved data in the cache server.

In at least one embodiment, the processing logic receives a second subsequent data query from a second application after retrieving the second pre-retrieved data. The processing logic determines that the second subsequent data query matches the second query pattern. The processing logic retrieves the second pre-retrieved data corresponding to the second subsequent data query from the cache server. The processing logic sends the second pre-retrieved data corresponding to the second subsequent data query to the second application.

In at least one embodiment, the application is a report generator that generates automated time-related reports using the pre-retrieved data corresponding to the subsequent data query. In another embodiment, the application can be other processes. In other embodiments, the queries can be received from a user, a machine (physical or virtual), a service, or the like.

In at least one embodiment, the application is executed by a network component of a cellular network. In at least one embodiment, the application is executed in an automation and analytics platform associated with a cellular network. The automation and analytics platform includes the ML model. In at least one embodiment, the automation and analytics platform includes an automation subsystem with the ML model, and an analytics subsystem with the application. In at least one embodiment, the application is a web application associated with a cellular network.

Figure 8:
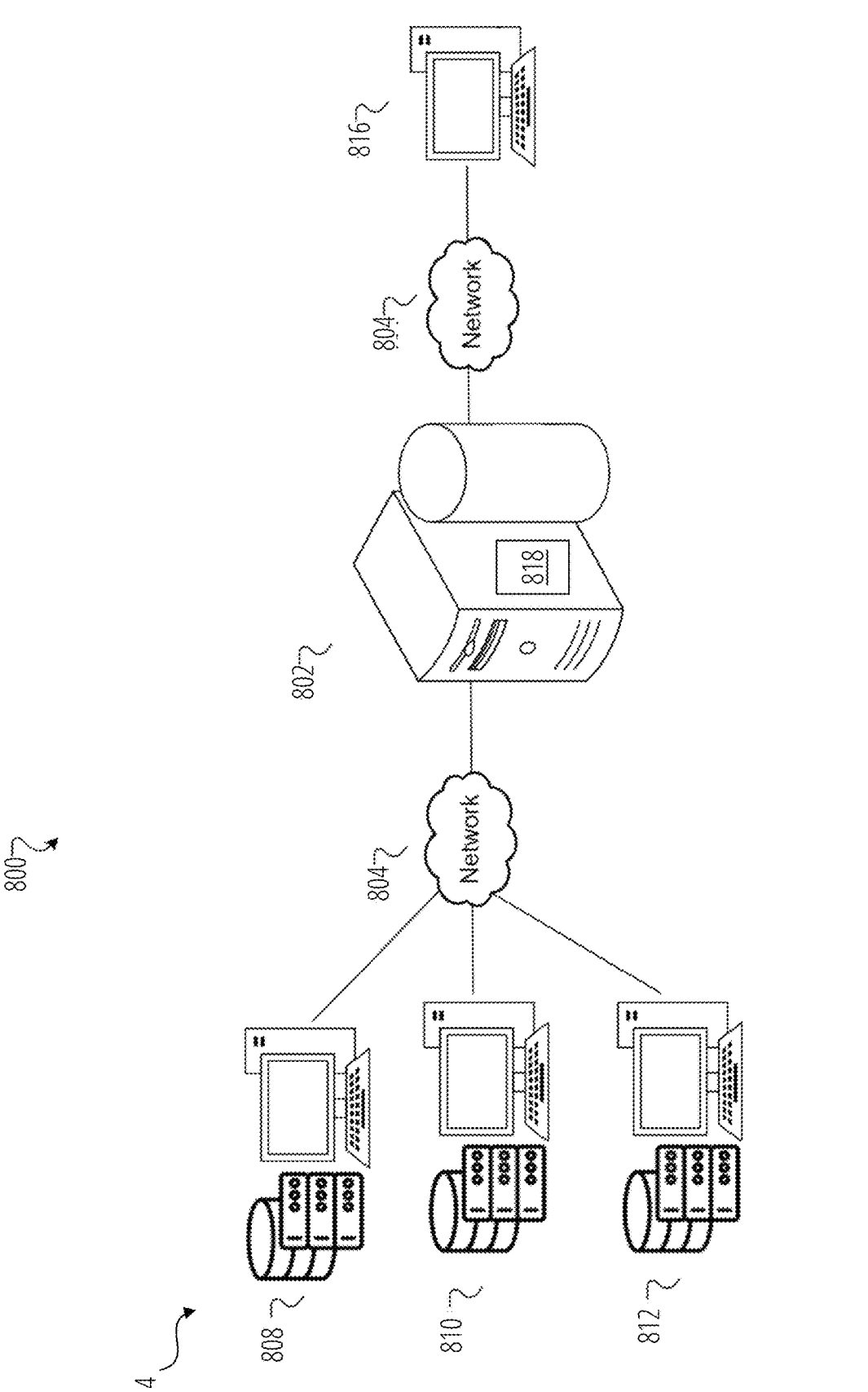
FIG. 8 is a block diagram of an example environment for providing a query server with pattern recognition logic 106 for data collected by a cellular network according to at least one embodiment.

FIG. 8 is a block diagram of an example environment 800 for providing a query server 818 with pattern recognition logic 106 for data collected by a cellular network according to at least one embodiment. The example environment 800 includes a computing system 802 including one or more computing devices, a network 804, one or more data sources 814, and a user device 816. The computing system 802 can execute a query server 818, including the pattern recognition logic 106, such as described herein.

The one or more data sources 814 can be located in different sites either on the same network or entirely different networks. Each data source 814 can have its own data included in data files. The data of each data source 814 can include structured data, unstructured data, or both. Structured data refers to data that is organized in a specific format or structure, making it easy to search, process, and analyze using automated tools. This data is typically stored in databases, spreadsheets, or other data management systems. Structured data is characterized by the presence of clearly defined fields, columns, and rows, and often follows a consistent format or syntax. Examples of structured data include financial data, inventory data, customer information, and transactional data. Unstructured data refers to data that is not organized in a specific format or structure, making it difficult to process and analyze using automated tools. This data is often created in a free-form manner and does not follow a consistent syntax. For example, unstructured data is a conglomeration of many varied types of data that are stored in their native formats, which can result in irregularities and ambiguities that make it difficult to understand as compared to structured data. Examples of unstructured data can include emails, social media posts, audio and video recordings, images, and text documents. Unstructured data is more difficult to analyze and interpret than structured data because it requires natural language processing and other advanced techniques to extract insights and meaning. However, unstructured data can provide valuable insights into customer sentiment, market trends, and other areas that are not easily captured by structured data.

The computing system 802 can include one or more computing devices, such as a server. The number of computing devices may be scaled (e.g., increased or decreased) automatically as per the computation resources needed. The various functional components of the computing system 802 may be installed on one or more computers as separate functional components or as different modules of a same functional component. For example, the various components of the computing system 802 can be implemented as computer programs installed on one or more computers in one or more locations that are coupled to each through a network. In cloud-based systems for example, these components can be implemented by individual computing nodes of a distributed computing system. The query server 818 can identifying, using the pattern recognition logic 106, a query pattern from a plurality of historical data queries directed to one or more target databases. Each of the plurality of historical data queries includes a plurality of parameters. At least one of the plurality of parameters comprises a temporal range to retrieve data corresponding to a specific period. The query server 818 can retrieve, according to the query pattern, pre-retrieved data from the one or more target databases and storing the pre-retrieved data in a cache server. The query server 818 can receive a subsequent data query from an application after retrieving the pre-retrieved data. In at least one embodiment, the application is executed by a network component of a cellular network. In at least one embodiment, the application is executed in an automation and analytics platform associated with a cellular network. The automation and analytics platform includes the ML model. In at least one embodiment, the automation and analytics platform includes an automation subsystem with the ML model, and an analytics subsystem with the application. Alternatively, the query server 818 can receive a subsequent data query from a process, a user, a service, a machine, or the like. The query server 818 can determine that the subsequent data query matches the query pattern. The query server 818 can retrieve the pre-retrieved data corresponding to the subsequent data query from the cache server. The query server 818 can send the pre-retrieved data corresponding to the subsequent data query to the application. The query server 818 can perform other operations as described herein, such as the operations described above with respect to method 600 of FIG. 6 or method 700 of FIG. 7.

The user device 816 can include personal computer, mobile communication device, and other devices that can communicate with the computing system 802 over the network 804. The network 804 can include a local area network ("LAN"), wide area network ("WAN"), the Internet, or a combination thereof. Each data source 814 can include one or more computing devices, such as a server. Each data source 814 can have its own database that stores its data files and corresponding data dictionaries.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed on a system of one or more computers in any form, including as a stand-alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to, one or more mass storage devices, and be configured to receive data from or transfer data to the mass storage devices. The mass storage devices can be, for example, magnetic, magneto-optical, or optical disks, or solid state drives. However, a computer need not have such devices.

Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on one or more computers having, or configured to communicate with, a display device, e.g., a LCD (liquid crystal display) or organic light-emitting diode (OLED) monitor, a virtual-reality (VR) or augmented-reality (AR) display, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback and responses provided to the user can be any form of sensory feedback, e.g., visual, auditory, speech or tactile; and input from the user can be received in any form, including acoustic, speech, or tactile input, including touch motion or gestures, or kinetic motion or gestures or orientation motion or gestures. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a sub-combination or variation of a sub-combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:
1. A method comprising:
receiving, by a computer system, a plurality of data queries from one or more applications directed to a target database, wherein each data query of the plurality of data queries comprises a plurality of parameters, wherein at least one parameter of the plurality of parameters comprises a temporal range to retrieve data corresponding to a specific period, wherein the receiving the plurality of data queries from one or more applications comprises receiving a plurality of application programming interface (API) calls from the one or more applications;
in response to receiving the plurality of data queries:
storing a copy of each data query of the plurality of data queries in a data store of the computer system;
identifying, using a machine learning (ML) model executed on the computer system and the plurality of parameters, a query pattern in the copies of the plurality of data queries in the data store;
creating, by the computer system, a scheduled task for the query pattern to retrieve pre-retrieved data from the target database;
retrieving, using the scheduled task, the pre-retrieved data from the target database and storing the pre-retrieved data in a cache server;
receiving a subsequent data query from an application after the retrieving the pre-retrieved data, wherein receiving the subsequent data query comprises receiving a subsequent API call of the plurality of API calls from the one or more applications;
determining that the subsequent data query matches the query pattern;
retrieving the pre-retrieved data corresponding to the subsequent data query from the cache server; and sending the pre-retrieved data corresponding to the subsequent data query to the application.

2. The method of claim 1, wherein the temporal range comprises at least one of a time range or a date range.

3. The method of claim 1, further comprising:

identifying, using the ML model and the plurality of parameters, a second query pattern in the copies of the plurality of data queries in the data store;

creating a second scheduled task for the second query pattern to retrieve second pre-retrieved data from the target database; and retrieving, using the second scheduled task, the second pre-retrieved data from the target database and storing the second pre-retrieved data in the cache server.

4. The method of claim 3, further comprising:

receiving a second subsequent data query from a second application after retrieving the second pre-retrieved data;

determining that the second subsequent data query matches the second query pattern;

retrieving the second pre-retrieved data corresponding to the second subsequent data query from the cache server; and sending the second pre-retrieved data corresponding to the second subsequent data query to the second application.

5. A computing system comprising:

one or more processors; and one or more memories storing instructions that, when executed by the one or more processors, cause the one or more processors to perform operations comprising:

receiving, by a computer system, a plurality of data queries from one or more applications directed to a target database, wherein each data query of the plurality of data queries comprises a plurality of parameters, wherein at least one parameter of the plurality of parameters comprises a temporal range to retrieve data corresponding to a specific period, and wherein receiving the plurality of data queries from one or more applications comprises receiving a plurality of application programming interface (API) calls from the one or more applications;

in response to receiving the plurality of data queries:

storing a copy of each data query of the plurality of data queries in a data store of the computer system;

identifying, using a machine learning (ML) model executed on the computer system and the plurality of parameters, a query pattern in the copies of the plurality of data queries in the data store;

creating, by the computer system, a scheduled task for the query pattern to retrieve pre-retrieved data from the target database;

retrieving, using the scheduled task, the pre-retrieved data from the target database and storing the pre-retrieved data in a cache server;

receiving a subsequent data query from an application after retrieving the pre-retrieved data, wherein receiving the subsequent data query comprises receiving a subsequent API call of the plurality of API calls from the one or more applications;

determining that the subsequent data query matches the query pattern;

retrieving the pre-retrieved data corresponding to the subsequent data query from the cache server; and sending the pre-retrieved data corresponding to the subsequent data query to the application.

6. The computing system of claim 5, wherein the operations performed by the one or more processors are executed in an automation and analytics platform associated with a cellular network, the automation and analytics platform comprising the ML model.

7. The computing system of claim 5, wherein the temporal range comprises at least one of a time range or a date range.

8. The computing system of claim 5, wherein the instructions cause the one or more processors to perform further operations comprising:

identifying, using the ML model and the plurality of parameters, a second query pattern in the copies of the plurality of data queries in the data store;

creating a second scheduled task for the second query pattern to retrieve second pre-retrieved data from the target database; and retrieving, using the second scheduled task, the second pre-retrieved data from the target database and storing the second pre-retrieved data in the cache server.

9. The computing system of claim 8, wherein the instructions cause the one or more processors to perform further operations comprising:

receiving a second subsequent data query from a second application after retrieving the second pre-retrieved data;

determining that the second subsequent data query matches the second query pattern;

retrieving the second pre-retrieved data corresponding to the second subsequent data query from the cache server; and sending the second pre-retrieved data corresponding to the second subsequent data query to the second application.

10. A device comprising:

a processor; and memory storing instructions that, when executed by the processor, cause the processor to perform operations comprising:

receiving, by a computer system, a plurality of data queries from one or more applications directed to a target database, wherein each data query of the plurality of data queries comprises a plurality of parameters, wherein at least one parameter of the plurality of parameters comprises a temporal range to retrieve data corresponding to a specific period, and wherein receiving the plurality of data queries from one or more applications comprises receiving a plurality of application programming interface (API) calls from the one or more applications;

in response to receiving the plurality of data queries:

storing a copy of each data query of the plurality of data queries in a data store of the computer system;

identifying, using a machine learning (ML) model executed on the computer system and the plurality of parameters, a query pattern in the copies of the plurality of data queries in the data store;

creating, by the computer system, a scheduled task for the query pattern to retrieve pre-retrieved data from the target database;

retrieving, using the scheduled task, the pre-retrieved data from the target database and storing the pre-retrieved data in a cache server;

receiving a subsequent data query from an application after retrieving the pre-retrieved data, wherein receiving the subsequent data query comprises receiving a subsequent API call of the plurality of API calls from the one or more applications;

determining that the subsequent data query matches the query pattern;

retrieving the pre-retrieved data corresponding to the subsequent data query from the cache server; and sending the pre-retrieved data corresponding to the subsequent data query to the application.

11. The device of claim 10, wherein the operations performed by the processor are executed in an automation and analytics platform associated with a cellular network, the automation and analytics platform comprising the ML model.

12. The device of claim 10, wherein the temporal range comprises at least one of a time range or a date range.

13. The device of claim 10, wherein the instructions cause the processor to perform further operations comprising:

identifying, using the ML model and the plurality of parameters, a second query pattern in the copies of the plurality of data queries in the data store;

creating a second scheduled task for the second query pattern to retrieve second pre-retrieved data from the target database; and retrieving, using the second scheduled task, the second pre-retrieved data from the target database and storing the second pre-retrieved data in the cache server.

14. The device of claim 13, wherein the instructions cause the processor to perform further operations comprising:

receiving a second subsequent data query from a second application after retrieving the second pre-retrieved data;

determining that the second subsequent data query matches the second query pattern;

retrieving the second pre-retrieved data corresponding to the second subsequent data query from the cache server; and sending the second pre-retrieved data corresponding to the second subsequent data query to the second application.

\* \* \* \* \*